US012020379B2

(12) United States Patent
Buerli et al.

(10) Patent No.: US 12,020,379 B2
(45) Date of Patent: Jun. 25, 2024

(54) VIRTUAL ANCHORING SYSTEMS AND METHODS FOR EXTENDED REALITY

(71) Applicant: APPLE INC., Cupertino, CA (US)

(72) Inventors: Michael E. Buerli, San Francisco, CA (US); Samuel L Iglesias, Palo Alto, CA (US); Tyler R. Calderone, Cupertino, CA (US); Mark A Ebbole, Austin, TX (US); Andrew P. Richardson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 17/184,588

(22) Filed: Feb. 24, 2021

(65) Prior Publication Data

US 2021/0327146 A1 Oct. 21, 2021

Related U.S. Application Data

(60) Provisional application No. 63/011,973, filed on Apr. 17, 2020.

(51) Int. Cl.
*G06T 7/50* (2017.01)
*G02B 27/01* (2006.01)
(Continued)

(52) U.S. Cl.
CPC .......... *G06T 19/006* (2013.01); *G02B 27/017* (2013.01); *G06F 3/04815* (2013.01);
(Continued)

(58) Field of Classification Search
CPC ......... G06T 19/006; G06T 7/50; G06T 19/20; G06T 2207/10028; G06T 15/005; G02B 27/017; G06F 3/04815; G06F 3/011
See application file for complete search history.

(56) References Cited

U.S. PATENT DOCUMENTS

| 8,022,967 | B2 | 9/2011 | Okuno et al. |
| 9,269,003 | B2 | 2/2016 | Schmalstieg |
| 10,186,087 | B2 | 1/2019 | Davis et al. |
| 10,319,150 | B1 * | 6/2019 | Canada ................. G06T 19/006 |
| 10,885,701 | B1 * | 1/2021 | Patel ....................... A63F 13/57 |

(Continued)

FOREIGN PATENT DOCUMENTS

| CN | 103460256 A | 12/2013 |
| CN | 107251100 A | 10/2017 |

(Continued)

OTHER PUBLICATIONS

Indian Office Action from Indian Patent Application No. 202114017465, dated Feb. 9, 2022, 5 pages.

(Continued)

*Primary Examiner* — Jitesh Patel
(74) *Attorney, Agent, or Firm* — BAKERHOSTETLER

(57) ABSTRACT

Implementations of the subject technology provide virtual anchoring for extended reality (XR) display devices. A device may generate an XR environment that includes computer-generated (CG) content for display relative to various physical objects in a physical environment. In order to position the CG content, an XR application may request a physical anchor object to which the CG content can be anchored. In circumstances in which the physical anchor object is not available in the physical environment, a virtual anchor and/or a virtual anchor object corresponding to the physical anchor object can be provided to which the CG content can be anchored.

22 Claims, 10 Drawing Sheets

(51) Int. Cl.
  *G06F 3/04815* (2022.01)
  *G06T 19/00* (2011.01)
  *G06T 19/20* (2011.01)

(52) U.S. Cl.
  CPC ............... *G06T 7/50* (2017.01); *G06T 19/20* (2013.01); *G06T 2207/10028* (2013.01)

(56) References Cited

U.S. PATENT DOCUMENTS

| | | | |
|---|---|---|---|
| 2019/0197599 A1* | 6/2019 | Zia | G06Q 30/0641 |
| 2019/0221040 A1* | 7/2019 | Shantharam | G06T 19/006 |
| 2019/0340825 A1* | 11/2019 | Laurent | G06T 19/006 |
| 2020/0081530 A1 | 3/2020 | Greenberg | |
| 2020/0118346 A1* | 4/2020 | Gough | G06T 19/20 |
| 2020/0151965 A1* | 5/2020 | Forbes | G06T 19/006 |
| 2020/0226823 A1* | 7/2020 | Stachniak | G06T 19/006 |

FOREIGN PATENT DOCUMENTS

| | | |
|---|---|---|
| EP | 3495926 A1 | 6/2019 |
| WO | WO 2012/135546 | 10/2012 |

OTHER PUBLICATIONS

Extended European Search Report from European Patent Application No. 21169012.8, dated Sep. 16, 2021, 9 pages.
European Office Action from European Patent Application No. 21169012.8, dated Apr. 3, 2023, 5 pages.
Chinese Office Action from Chinese Patent Application No. 202110407376.4, dated Jan. 27, 2024, 13 pages including machine-generated English language translation.
European Office Action from European Patent Application No. 21169012.8, dated Feb. 9, 2024, 5 pages.

* cited by examiner

VIRTUAL ANCHORING SYSTEMS AND METHODS FOR EXTENDED REALITY

CROSS REFERENCE TO RELATED APPLICATIONS

This application claims the benefit of priority to U.S. Provisional Patent Application No. 63/011,973, entitled "Virtual Anchoring Systems And Methods For Computer-Generated Reality," filed on Apr. 17, 2020, the disclosure of which is hereby incorporated herein in its entirety.

TECHNICAL FIELD

The present description relates generally to extended reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user. However, it can be challenging to determine where in the physical environment to place the electronic information.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
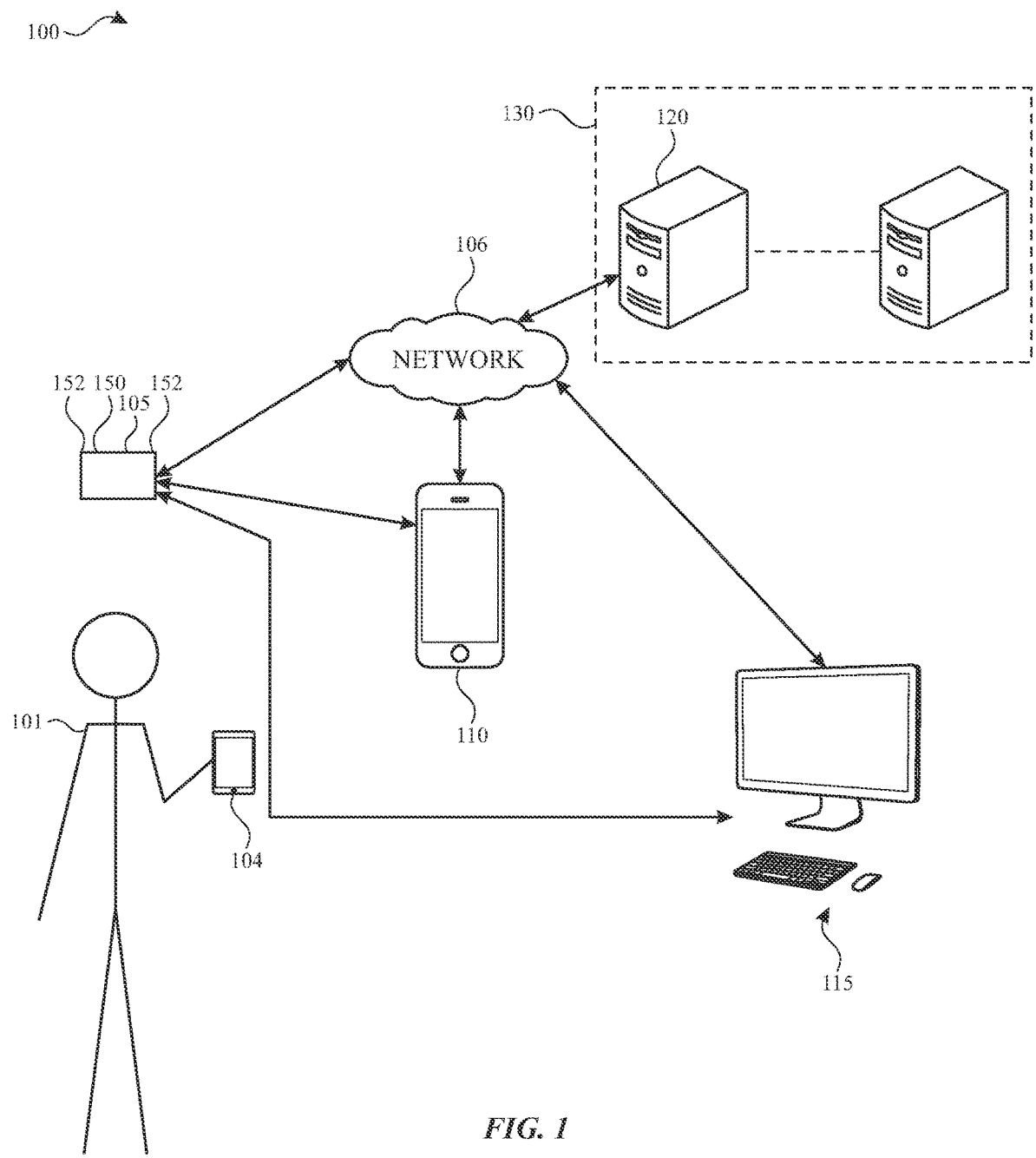
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide an XR system that provides a virtual anchor at a location in a physical environment, when a requested physical anchor object is not available. For example, an XR application may request, from a device, a physical table on which to display a virtual object. The XR system may determine that the requested physical table is not available in the physical environment, and can generate a virtual anchor and/or a virtual version of the requested physical anchor object (e.g., a virtual anchor object) at a fixed location in the physical environment. The virtual content can then be rendered and displayed at the fixed location, either in space at the location of the virtual anchor, or on the virtual anchor object as though displayed on the requested physical anchor object, had the physical anchor object been available.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be a smartphone, a tablet, or a head mountable portable system (e.g., a head mountable display device that can be worn by a user), that includes a display system capable of presenting a visualization of an extended reality environment to the user. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access a extended reality environment, the user may use a handheld electronic device 104, such as a tablet, watch, mobile device, and the like.

The electronic device 105 may include one or more cameras such as camera 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating recording within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects to an XR application generating virtual content for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic system discussed below with respect to FIG. 10. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 10.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
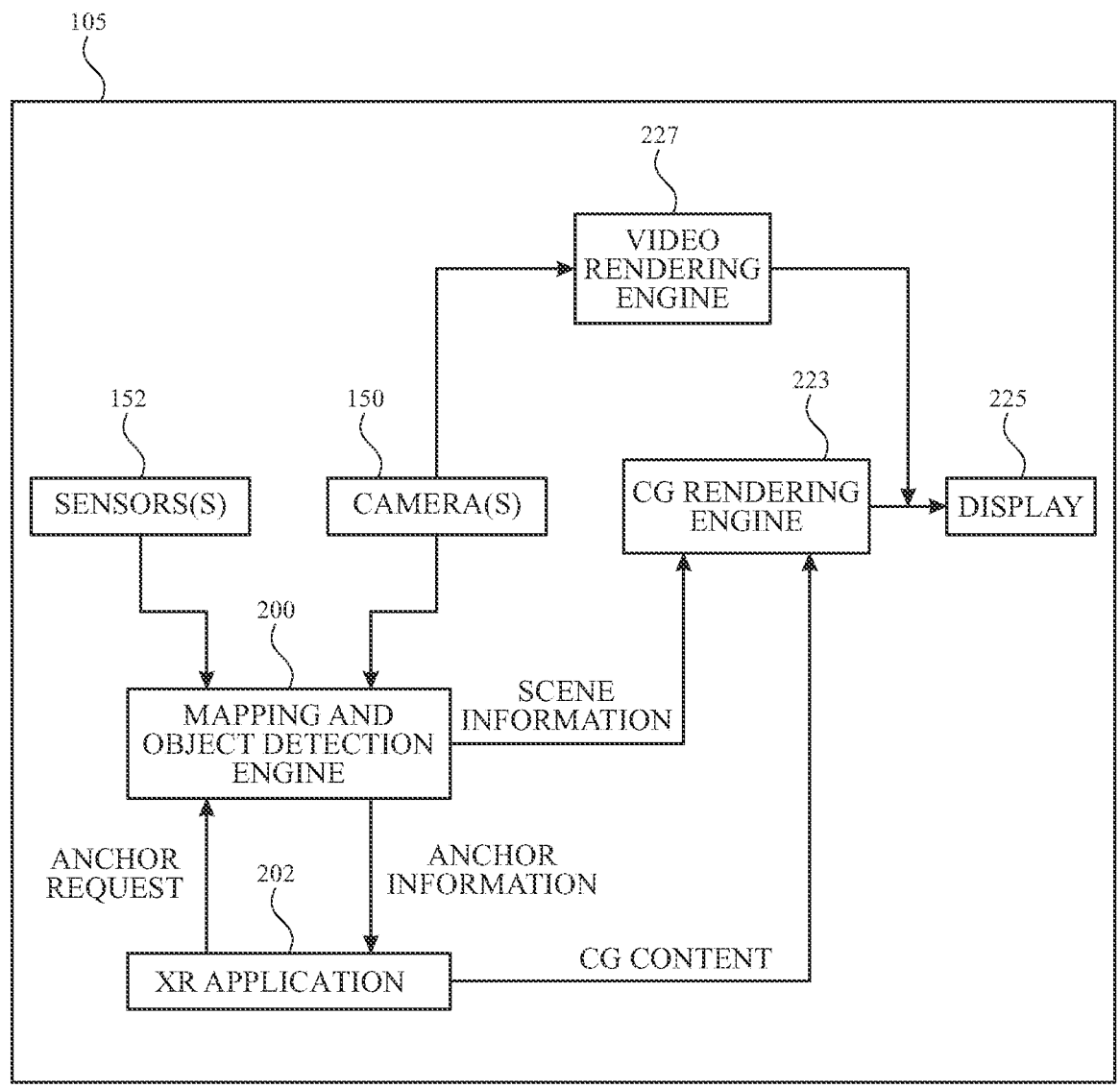
FIG. 2 illustrates an example software architecture in accordance with one or more implementations of the subject technology.

FIG. 2 illustrates an example architecture that may be implemented on the electronic device 105, the handheld electronic device 114, the electronic device 115, and/or the server 120 in accordance with one or more implementations of the subject technology. For explanatory purposes, portions of the architecture of FIG. 2 is described as being implemented by the electronic device 105 of FIG. 1, such as by a processor and/or memory of the electronic device 105; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Figure 3:
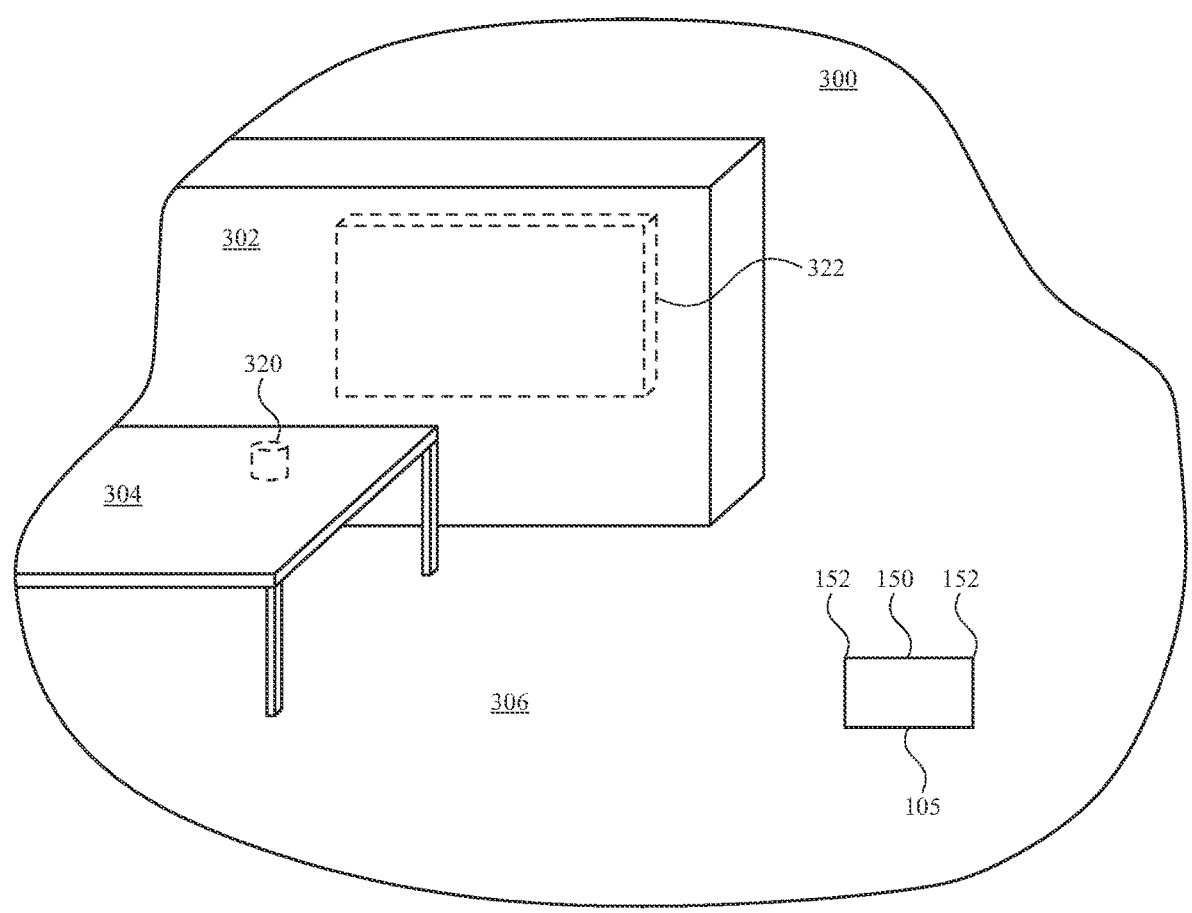
FIG. 3 illustrates an example of a physical environment of an electronic device in accordance with implementations of the subject technology.

Various portions of the architecture of FIG. 2 can be implemented in software or hardware, including by one or more processors and a memory device containing instructions, which when executed by the processor cause the processor to perform the operations described herein. In the example of FIG. 3, sensors 152 provide environment information (e.g., depth information from one or more depth sensors) to a mapping and object detection engine 200. Camera(s) 150 may also provide images, such as a video stream, to mapping and object detection engine 200. Mapping and object detection engine 200 may generate a three-dimensional scene information, such as three-dimensional map, of some or all of the physical environment of electronic device 105 using the environment information (e.g., the depth information and/or the images) from sensors 152 and camera(s) 150.

As illustrated in FIG. 2, an XR application 202 may request an anchor, such as a physical object anchor, from the mapping and object detection engine 200 in an anchor request. XR application 202 may be a gaming application, a media player application, a content-editor application, a training application, a simulator application, or generally any application that displays CG or virtual content at locations that depend on the physical environment, such as by anchoring the virtual content to a physical object anchor.

A physical object anchor can be a general physical object such as a horizontal planar surface (e.g., a surface of a floor or a tabletop), a vertical planar surface (e.g., a surface of a wall), or a specific physical object such a table, a wall, a television stand, a couch, a refrigerator, a desk, a chair, etc. XR application 202 may include code that, when executed by one or more processors of electronic device 105, generates CG content (e.g., a virtual cup, a virtual document, a virtual television screen, a virtual movie theater screen, a virtual keyboard, or other virtual content), for display on, near, attached to, or otherwise associated with the physical object anchor. XR application 202 generates this virtual content when mapping and object detection engine 200 detects the physical object anchor in the environment information from sensors 152 and camera(s) 150, and provides the relevant anchor information to the XR application 202 and/or to CG rendering engine 223.

Once the CG content (e.g., the virtual cup, virtual document, virtual television screen, virtual movie theater screen, virtual keyboard, etc.) has been generated, the CG content can be provided to a CG rendering engine 223, as illustrated in FIG. 2. Environment information such as a depth map of the physical environment, and/or object information for detected objects in the physical environment, can also be provided to CG rendering engine 223. CG rendering engine 223 can then render the CG content from XR application 202 for display by display 225 of electronic device 105. The CG content is rendered for display (e.g., using the scene information and/or anchor information provided by mapping and object detection engine 200) at the appropriate location on the display 225 to appear in association with the physical anchor object provided by mapping and object detection engine 200. Display 225 may be, for example, an opaque display, and camera 150 may be configured to provide a pass-through video feed to the opaque display. The CG content may be rendered for display at a location on the display corresponding to the displayed location of the physical anchor object in the pass-through video. Display 225 may be, as another example, a transparent or translucent display. The CG content may be rendered for display at a location on the display corresponding to a direct view, through the transparent or translucent display, of the physical anchor object.

As shown, electronic device 105 can also include a video rendering engine 227 that renders video images of the physical environment, based on images from camera(s) 150, for display together with the rendered CG content from CG rendering engine 223. For example, video rendering engine 227 may be provided in electronic devices 105 that include an opaque display, to provide pass-through video to the display. In electronic devices 105 that are implemented with a transparent or translucent display that allows the user to directly view the physical environment, video rendering engine 227 may be omitted or unused in some circumstances. Although the example of FIG. 2 illustrates a CG rendering engine 223 that is separate from XR application 202, it should be appreciated that, in some implementations, XR application 202 may render CG content for display by display 225 without using a separate CG rendering engine 223.

Electronic device 105 may allow XR application 202 to request and obtain anchor information from mapping and object detection engine 200 (e.g., via an application programming interface, or API) as illustrated in FIG. 2, which can facilitate efficient development, implementation, and/or run-time execution of XR application 202 (e.g., since each XR application 202 does not have to do its own object detection, scene mapping, transforms, etc.). However, this can be problematic in scenarios in which a physical anchor object that is requested by XR application 202 does not exist, or is otherwise not available in the physical environment. For example, an XR application 202 may request a table on which to anchor a virtual cup at a time when there is no table in the physical environment of electronic device 105 (e.g., within a mapping distance of electronic device 105), or no table is within the field of view of the user of electronic device 105. That is, electronic device 105 (e.g., mapping and object detection engine 200) may determine, based on the environment information from sensors 152 and/or camera(s) 150, that the physical anchor object (the table in this example) is not available in the physical environment. Sensors 152 may include at least one depth sensor, and the environment information may include environment information based on at least one image from the camera and depth information from the depth sensor.

In circumstances in which the requested physical anchor object is not available, electronic device 105 (e.g., mapping and object detection engine 200) generates a virtual anchor having a fixed location in the physical environment, and provides the virtual anchor to XR application 202 and/or to CG rendering engine 223 responsive to the request for the physical anchor object. XR application and/or CG rendering engine 223 can then render virtual content for display at the fixed location in the physical environment using the virtual anchor. Electronic device 105 (e.g., mapping and object detection engine 200) may also generate a virtual anchor object corresponding to the physical anchor object. For example, if a physical wall is requested as a physical anchor object, and the physical wall is not available, electronic device 105 (e.g., CG rendering engine 223) may generate and render a virtual wall (e.g., the virtual anchor object) for display at a location on the display of the electronic device 105 that causes the virtual anchor object to appear to the user to be at the fixed location in the physical environment. XR application 202 and/or CG rendering engine 223 may then render the virtual content to also appear to the user to be at or near the fixed location in the physical environment, using the virtual anchor. This anchoring of the virtual content to the virtual anchor object includes positioning the rendered virtual content relative to the rendered virtual anchor object (e.g., by positioning the rendered virtual content to appear on the virtual wall.

In one or more implementations, during operation of, for example, an XR application such as XR application 202, transforms of physical anchors and/or virtual anchors may be updated at the system level of electronic device 105 (e.g., by mapping and object detection engine 200 and/or CG rendering engine 223 without round trip communication to the requesting application). For example, CG rendering engine 223 may update the position and/or orientation of CG content provided by XR application 202 based on the physical and/or virtual anchor (e.g., based on a physical and/or virtual anchor identified for XR application 202, such as in response to an anchor request from the XR application). In this way, an electronic device such as electronic device 105 can render CG content anchored to, or relative to, physical locations within a physical environment with lower latency than in scenarios in which the position and orientation of the virtual content is updated at the XR application 202. Reducing the rendering latency in this way can help electronic device 105 provide an experience that is free of potential XR anchoring artifacts such as application content appearing to unintentionally swim around relative to the physical environment and/or other XR content.

Figure 4:
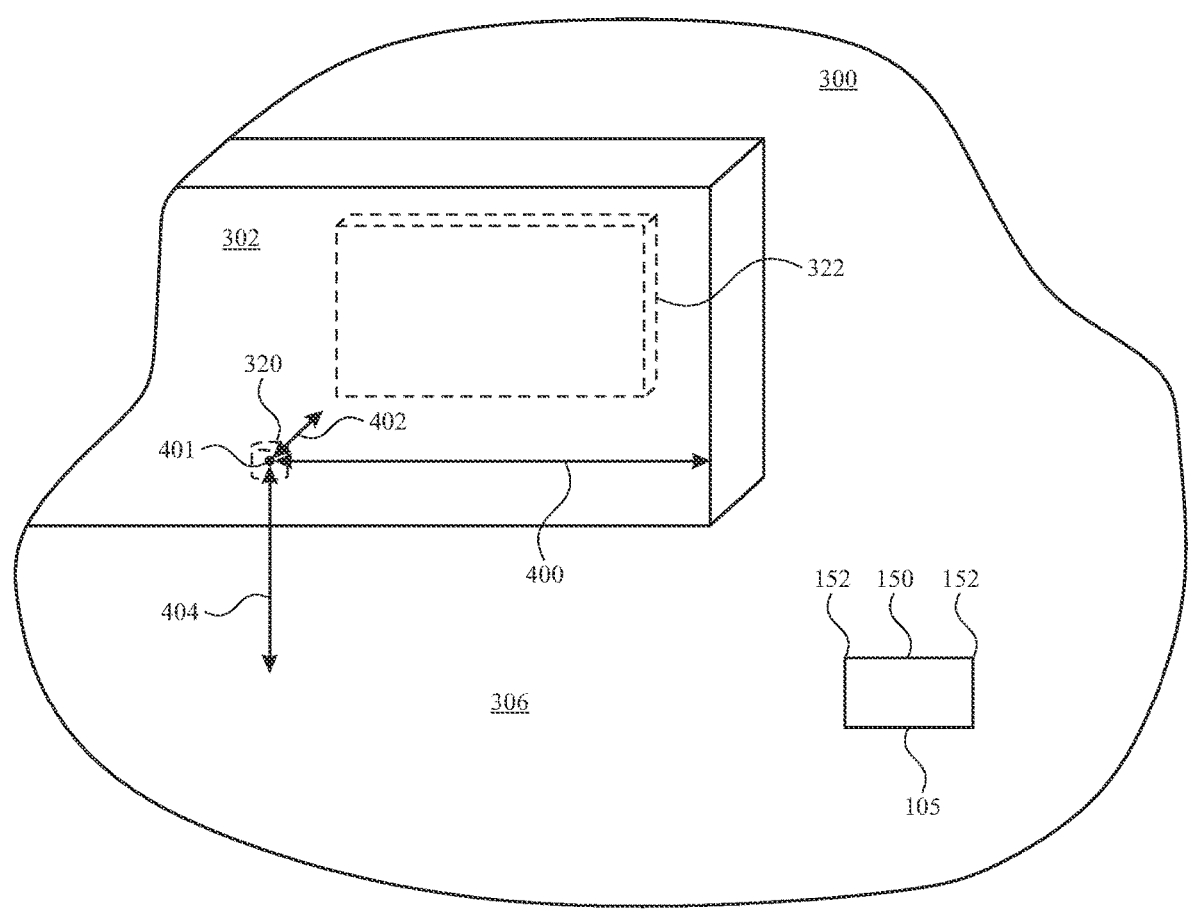
FIG. 4 illustrates an example in which virtual content is anchored to physical object anchors in the physical environment in accordance with implementations of the subject technology.
Figure 5:
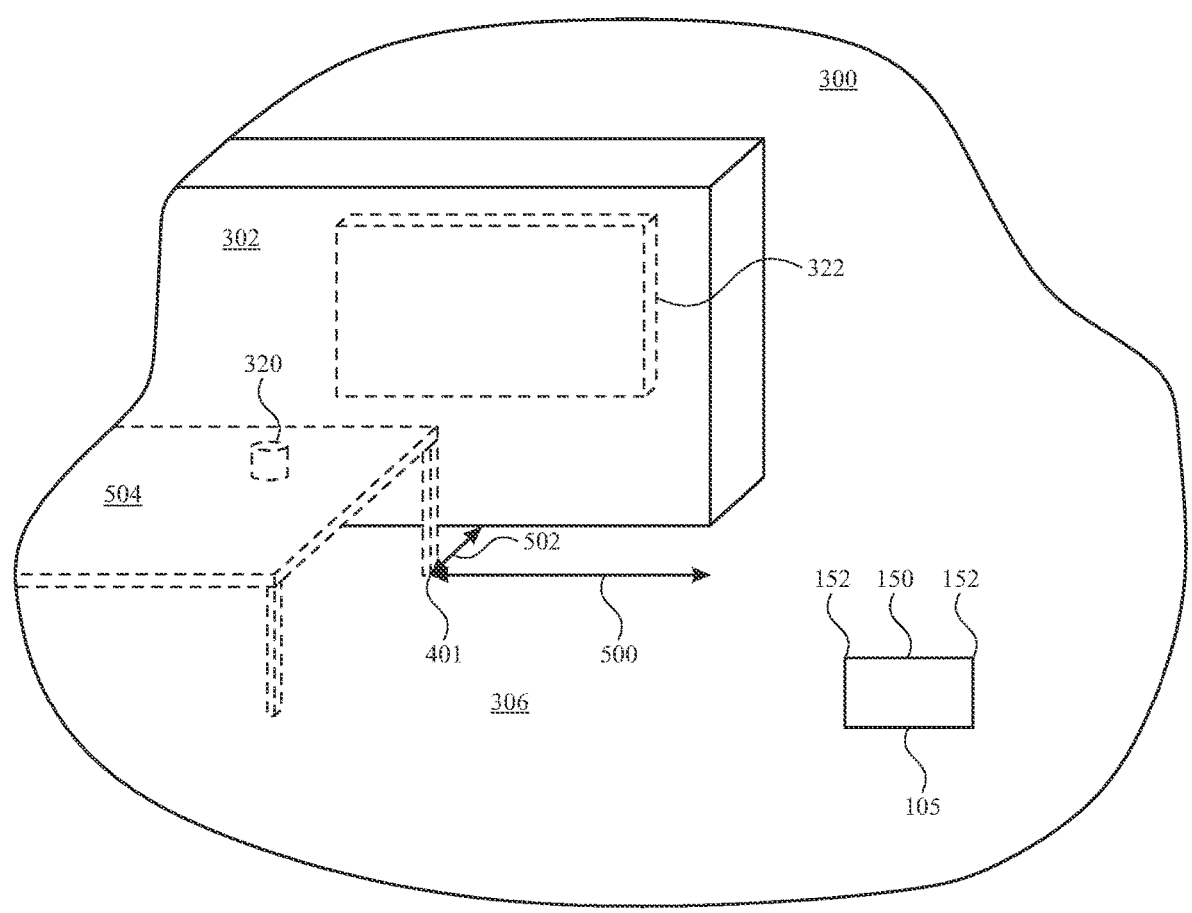
FIG. 5 illustrates an example in which virtual content is anchored to a physical object anchor and a virtual anchor in an XR environment in accordance with implementations of the subject technology.

FIGS. 3, 4, and 5 illustrate examples in which virtual content is anchored, respectively, to a physical anchor object, a virtual anchor, and a virtual anchor object according to aspects of the disclosure.

In the example of FIG. 3, a user 101 wears an electronic device 105 in a physical environment 300. The physical environment 300, in the example of FIG. 3, includes a physical wall 302, a physical table 304, and a physical floor 306 that can be detected, mapped, and/or categorized using environment information based on images from one or more cameras such as camera 150 and one or more sensors (e.g., depth sensors) such as sensors 152. In the example of FIG. 3, virtual content including a virtual cup 320 and a virtual television 322 are displayed by a display (e.g., display 225) of electronic device 105 to appear to the user 101 to be at fixed locations in the physical environment. In this example, the virtual cup 320 is anchored to the physical table 304, and the virtual television 322 is anchored to the physical wall 302. In this way, virtual content can be displayed to appear at fixed locations in physical environment 300, even as a user 101 moves and/or looks around in the physical environment.

In order to anchor a virtual cup 320 to a physical table 304, or to anchor a virtual television 322 to a physical wall 302, an XR application may request (e.g., from a mapping and object identification engine) a physical table (or a horizontal plane) or a physical wall (or vertical plane) in the physical environment, to which the XR application can anchor the relevant virtual content. In order to use the physical table or the physical wall as physical anchor objects, the XR application may obtain locations of one or more points on the physical object that describe the physical location, shape, position, and/or orientation of the physical object. For example, the locations of three points on the surface of the physical table 304 may be provided that allow the XR application to identify a plane corresponding to the surface of the table. The XR application can then determine where to position, and how to orient, the virtual cup 320 to appear to rest on the surface of the table. In other examples, more information for the physical anchor object (e.g., a three-dimensional mesh of the object) can be provided for physical anchoring.

In some circumstances, when the XR application requests a physical anchor object, electronic device 105 may determine (e.g., based on the environment information from sensors 152 and/or camera 150), that the physical anchor object is not available in the physical environment.

FIG. 4 illustrates an example in which the physical environment 300 includes a physical wall 302, but does not include a physical table. Responsive to a request for a physical anchor object in the form of a physical table, and the determination that the physical table is not available, electronic device 105 may generate a virtual anchor having a fixed location in the physical environment. In the example of FIG. 4, the XR application has been provided with a virtual anchor 401 to which to anchor the virtual cup 320, and the virtual cup 320 has been rendered and displayed to appear to be located at the fixed location of the virtual anchor 401.

In this example, the virtual anchor 401 is a single point at a fixed location in the physical environment. The fixed location of the virtual anchor 401 may be defined relative to physical objects in the physical environment 300, so that the virtual anchor (and any virtual content anchored thereto) remains at the fixed physical location, even as the user 101 moves and/or looks around the XR environment including the physical environment 300 and the virtual content. In this example, the fixed location of the virtual anchor 401 is defined by a first distance 404 from the physical floor 306, a second distance 402 from the physical wall 302, and third distance 400 from an end of the physical wall. However, these distances are merely illustrative, and the fixed location of a virtual anchor 401 can be defined relative to any three points in the physical environment.

In the example of FIG. 4, virtual anchor 401 is at a fixed location that is in the air in the physical environment 300, resulting in a virtual cup 320 that appears to be floating in space, when displayed by electronic device 105 at the fixed location of the virtual anchor. The fixed location of the virtual anchor 401 can be determined automatically by electronic device 105 (e.g., based on heuristics) and/or can be chosen and/or modified by the user 101. For example, the user 101 can move the virtual anchor 401 using a handheld control, by virtually grabbing or pinching the virtual anchor (e.g., as detected using camera(s) 150 and/or sensors 152), using voice commands, or other input modalities for electronic device 105.

In order to facilitate placing and/or moving the virtual anchor 401, electronic device 105 can highlight potential locations in the physical environment 300 for a virtual anchor (e.g., to assist a user choosing a fixed location). For example, potential locations in the physical environment 300 can be dynamically highlighted based on the user's field of view, gaze location, and/or velocity of movement (e.g., to allow the user to place or throw the virtual anchor 401 to a recommended location). Potential locations can be locations in space with sufficient room for particular virtual content, or locations at or near other physical objects that may be suitable for display of the virtual content.

The example of FIG. 4 can result in an XR environment that is different from the desired XR environment from XR application. For example, in order to make the XR environment look and feel realistic to a user, a virtual anchor that causes a virtual cup to float in space can be undesirable.

The disclosed systems and methods can provide an improved XR experience in some scenarios, by providing a virtual anchor object that corresponds to the requested physical anchor object when the physical anchor object is not available in the physical environment. For example, if the physical environment is suitable (e.g., if there is space on the floor of a room) and if the requested anchor is a physical object (e.g., a horizontal surface, a table, or a wall), a virtual version of that requested physical object can be rendered and displayed.

FIG. 5 illustrates an example, in which the physical environment 300 includes a physical wall 302, but does not include a physical table, and in which a virtual table 504 is provided as a virtual anchor object corresponding to the unavailable physical anchor object. As illustrated in FIG. 5, a virtual anchor object such as the virtual table 504 can be rendered for display so that the virtual table 504 appears to user 101 to be at or anchored to a fixed location of a virtual anchor 401 in the physical environment. In this example, the bottom of one of the legs of the virtual table is located at the virtual anchor 401 (e.g., as defined by a distance (zero in this example) from the physical floor 306, a distance 502 from the physical wall 302, and distance 500 from the end of the physical wall 302), and the remaining portions of the virtual table 504 (e.g., the table top and the other legs) are generated relative to that position based on the desired size and shape of the table and based on the available space in the physical environment 300 for the virtual table. In various examples, the size, orientation, shape, etc. of the virtual anchor object associated with the requested physical object depends on detected features of the environment.

In the example of FIG. 5, a virtual cup 320 is rendered for display at a fixed location that is determined based on the size, location, position, and/or shape of the virtual anchor object (e.g., the virtual table 504). In this example, the virtual cup 320 is positioned at a different location than the location of the virtual anchor 401, but fixed relative to the virtual anchor and the physical environment at a location determined by the characteristics of the table. It should also be understood that the location of the virtual anchor 401 relative to the virtual anchor object and the virtual cup 320 in FIG. 5 are merely illustrative, and other arrangements are possible in which virtual content is anchored to a virtual anchor object that is itself anchored to a fixed location relative to a physical environment. For example, the virtual anchor may be located at another location on the virtual anchor object (e.g., the center of the table top), separated from the virtual anchor object, or the virtual anchor object itself may be the virtual anchor. In various examples, rendering the virtual content for display at a fixed location in the physical environment using a virtual anchor may include positioning the rendered virtual content relative to the rendered virtual anchor object.

Prior to generating the virtual anchor object (e.g., the virtual table in the example of FIG. 5), electronic device 105 may identify an available space for the virtual anchor object based on the environment information for the physical environment 300. Electronic device 105 may determine a size for the virtual anchor object based on the identified available space for the virtual anchor object. Electronic device 105 may provide user 101 with the ability to resize a virtual anchor object (e.g., using gesture-based, controller-based or other input).

In some circumstances, electronic device 105 may determine that a physical environment is not suitable for providing a virtual anchor object corresponding to a requested physical anchor object (e.g., if there is not space in the room for a virtual table, or if there is no clear view of a wall). In circumstances in which a physical environment is not suitable for providing a virtual anchor object, a virtual anchor that is a point in space without an associated virtual anchor object can be provided (as in the example of FIG. 4), or a virtual portal can be generated to create space in the XR environment in which to render the virtual version of the requested physical anchor object. This can be particularly useful in crowded spaces such as on a bus or a plane, where a virtual portal can create a partial immersion environment that replaces nearby objects (such as the seat and tray table in front of the user) with a space in which a virtual version of a physical object (e.g., a virtual table, a virtual movie screen, a virtual wall) can be displayed.

Figure 6:
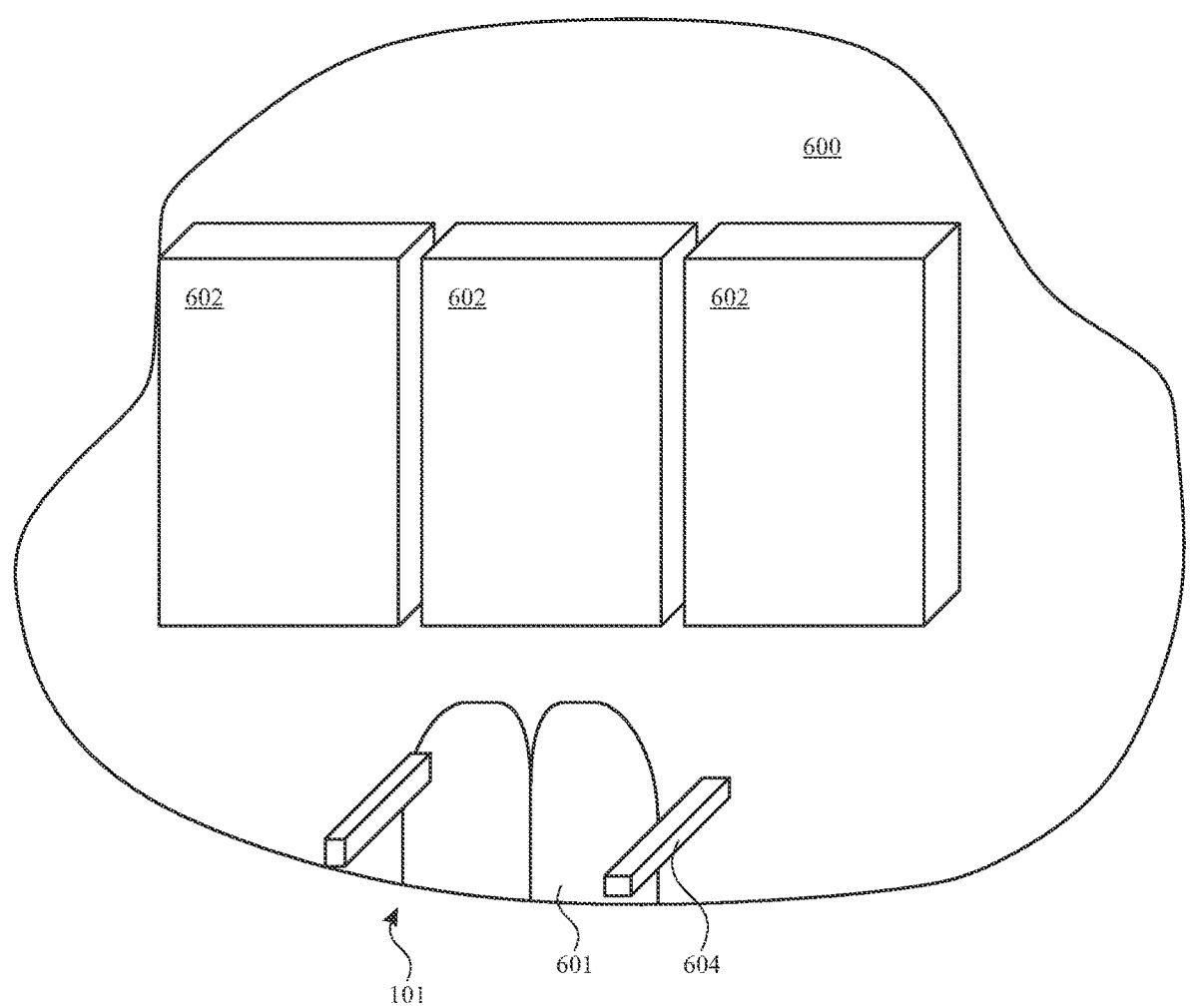
FIG. 6 illustrates an example in which virtual content is anchored to a physical object anchor and to a virtual object anchor in an XR environment accordance with implementations of the subject technology.

FIG. 6 illustrates an example of a physical environment 600 that does not include sufficient space for rendering a virtual anchor object such as the virtual table of FIG. 5, a virtual wall, or the like. In the example of FIG. 6, a user 101 (who may be wearing an electronic device 105) views a portion of a physical environment 600 that includes the backs of three seats 602 (e.g., airplane seats or bus seats) in a row ahead of a row in which the user is seated, and that includes armrests 604 of the user's own seat and a portion of the user's legs 601.

In a scenario in which an XR application of electronic device 105 requests a physical anchor object in the form of a physical table while the user is in physical environment 600, the physical environment 600 does not include the requested physical anchor object and electronic device 105 may determine that there is insufficient space in the physical environment 600 for a virtual anchor object corresponding to the requested physical table.

Figure 7:
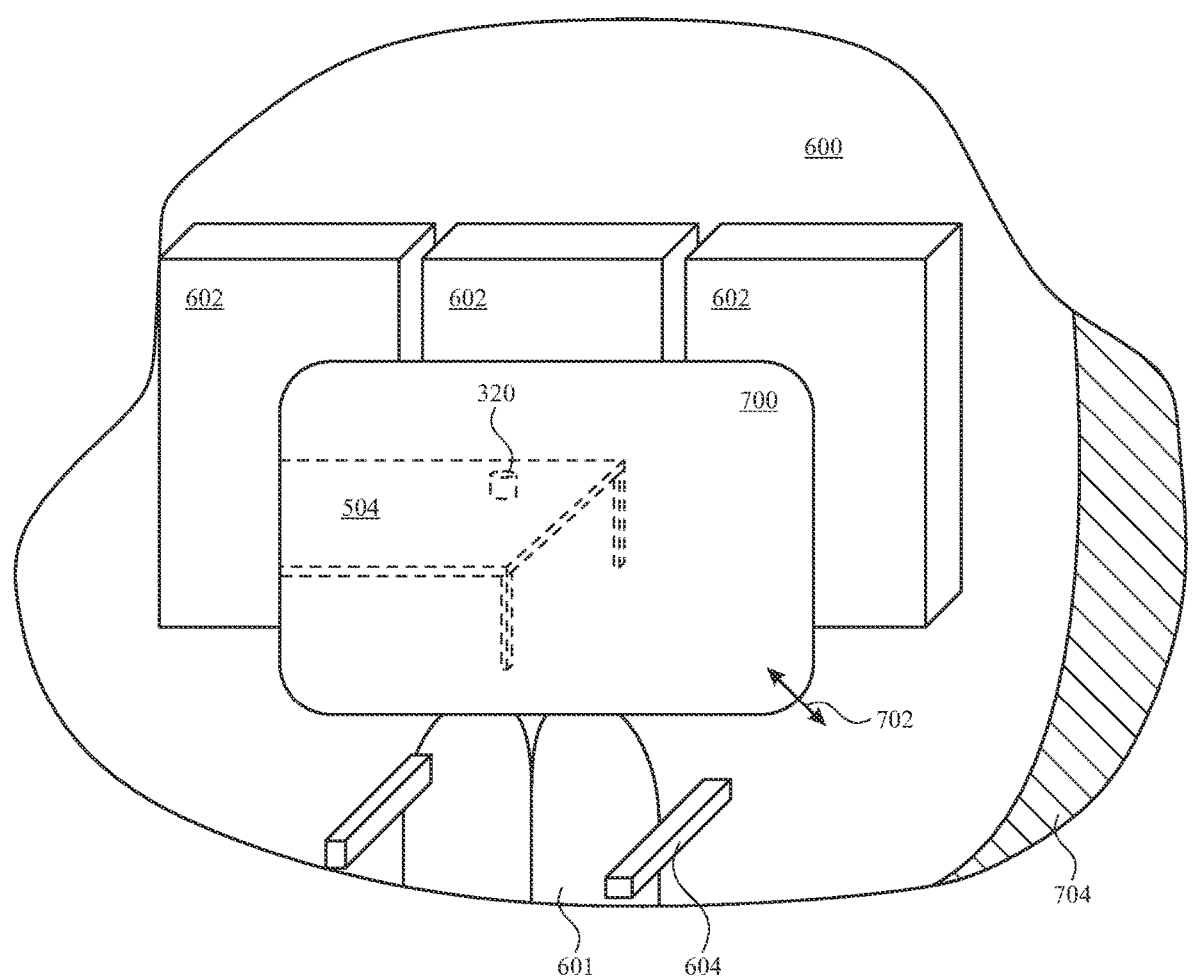
FIG. 7 illustrates an example of a physical environment of an electronic device, without sufficient space for a virtual anchor object in accordance with implementations of the subject technology.

FIG. 7 illustrates an example in which electronic device 105 generates and renders a virtual portal 700 for display over a portion of the physical environment 600. In this example, a virtual anchor object such as virtual table 504 is rendered by electronic device 105 for display at a fixed location relative to the physical environment by rendering the virtual anchor object for display in the virtual portal 700. In this example, the virtual portal and/or the virtual table can be anchored to the physical environment (e.g., to a locations on one seats 602).

As shown in FIG. 7, providing a virtual portal 700 may include blocking out the user's view of a portion of the physical environment. The can include preventing, with a display of the electronic device 105, a view of the physical environment, and displaying the rendered virtual environment with the display. Preventing the view of the physical environment with the display may include, in one example, terminating display of a pass-through video feed corresponding to the blocked portion of the physical environment from a camera of the electronic device. Preventing the view of the physical environment with the display may include, in another example, directing display light into an eye of a user with a transparent or translucent display of the electronic device that is disposed between the physical environment and the eye(s) of the user. The virtual anchor object and the virtual content that is anchored to that object can then be rendered and displayed in (e.g., overlaid on) the virtual portal 700.

As indicated by arrows 702, virtual portal 700 may be adjustable (e.g., resizable) by the user. For example, the user can reach out their hand to a location that appears to the user to be the corner or edge of the virtual portal 700 and pinch or otherwise virtually grasp the corner or edge, and pull or push the virtual edge to increase or decrease the size of the virtual portal. Increasing or decreasing the size of the virtual portal 700 in this way causes the virtual portal 700 to be displayed over an expanded portion or a decreased portion of the physical environment 600. In some cases, the size of the virtual portal may be limited by the characteristics of the physical environment. For example, if the user resizes virtual portal 700 until the edge of the virtual portal encounters the physical wall 704 of the airplane or bus, the user may be prevented from further increasing the size of the virtual portal 700, or the virtual portal may be replaced with a virtual environment.

Figure 8:
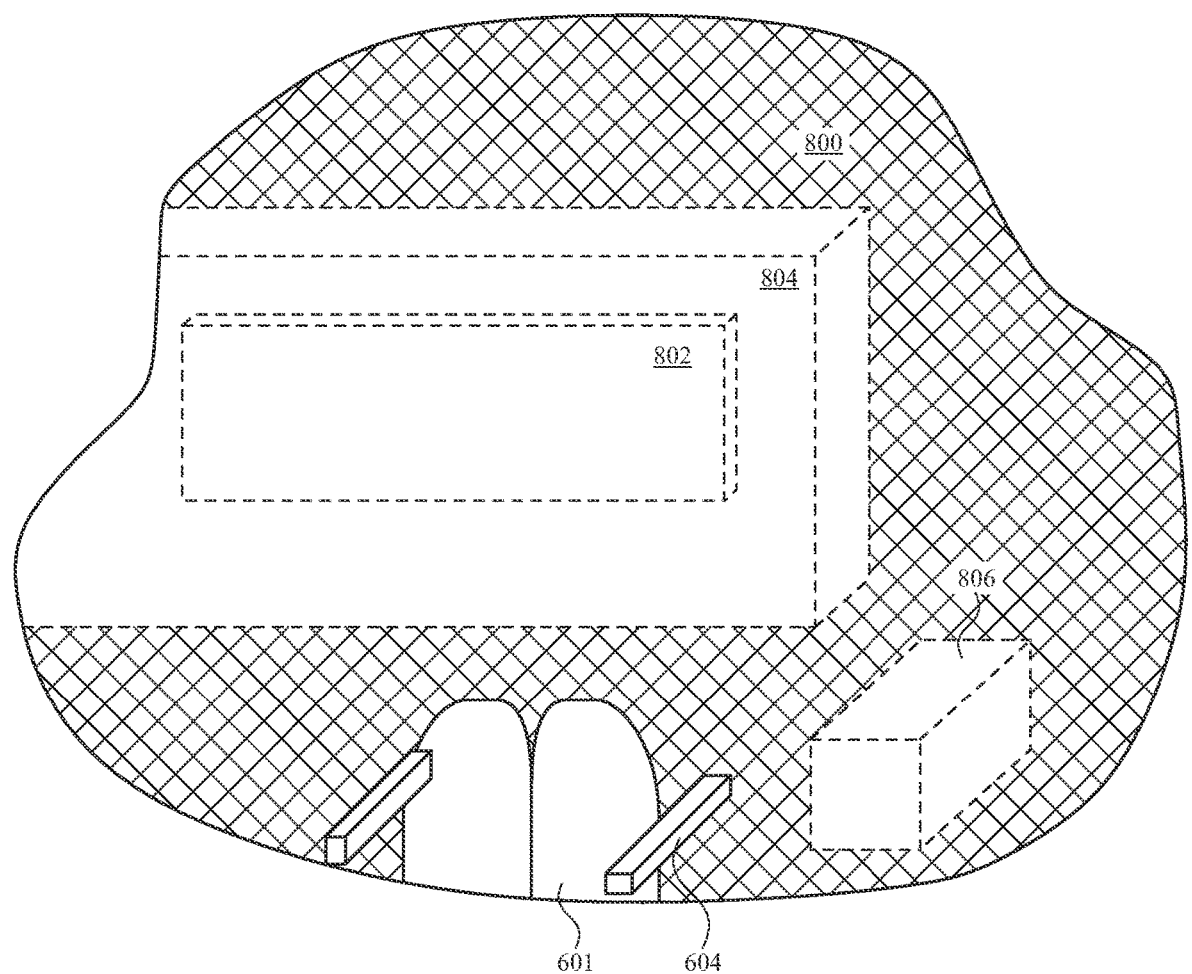
FIG. 8 illustrates an example of a virtual portal in a physical environment of an electronic device to generate sufficient virtual space for a virtual anchor object in accordance with implementations of the subject technology.

FIG. 8 illustrates and example in which the user's view of the physical environment 600 of FIGS. 6 and 7 is blocked by a displayed virtual environment 800, except for the user's view of their own legs 601 and the armrests 604 of their own seat. In the example of FIG. 8, the user's legs and armrest remain visible to help the user orient in the virtual environment. However, this is merely illustrative, and in other examples, more or less (e.g., none) of the physical objects and/or environment may be visible to the user.

The virtual environment 800 can be provided when the user resizes a virtual portal beyond a predetermined size (e.g., beyond 180 degree field of view of the user) or when it is initially determined that there is insufficient space in the physical environment for a virtual anchor object (e.g., if the user sets a preference for a virtual environment instead of a virtual portal). In the example of FIG. 8, electronic device 105 has rendered and displayed a virtual environment 800 over the physical environment 600, and rendered and displayed a virtual anchor object (e.g., a virtual wall 804) for display at a fixed location relative to the physical environment 600 (e.g., by rendering the virtual anchor object at a fixed location in the virtual environment 800). Although not visible to the user, at least one location such as a point on virtual wall 804 is anchored to a location in the physical environment 600, so that the virtual content (e.g., a virtual movie screen 802 in the example of FIG. 6) can be anchored to the virtual anchor. In this way, the virtual content can be displayed at a fixed location in the virtual environment 800 even if the user moves and/or looks around the physical environment 600.

In various operational scenarios, the virtual environment 800 can be an artificial environment (e.g., a virtual movie theater, a virtual beach, etc.) or can be a virtual version of a known physical environment that is different from the current physical environment 600. For example, the known physical environment may be the user's home, the user's living room, the user's bedroom, the user's office, the user's car, or any other physical environment that has been previously mapped (e.g., by the electronic device 105 or another device with depth sensing and/or imaging capabilities). A known physical environment may include one or more known physical anchor objects (e.g., the user's television stand, the user's bedroom wall, the user's kitchen table, the user's office desk, etc.). The known physical anchor objects can be requested separately from the known physical environment and/or as part of a known physical environment.

In the example of FIG. 8, the virtual environment may include other virtual objects such as a virtual end table 806 that corresponds to a physical end table in the user's living room. In this example, the requested physical anchor object can be a known physical wall in the user's living room, and the virtual anchor object can be a virtual wall 804 that corresponds (e.g., in size, shape, color, location, etc.) to a wall of the user's living room. In this way, the user can be provided with a virtual environment that is fixed (e.g., anchored) to a current physical environment, and that makes the user feel as though they are in a different, known physical environment (e.g., so that the user can feel as though they are watching a movie in their living room or working at their own office desk, even while on a plane, in a bus, or in a hotel room).

Displaying a virtual environment, as in the example of FIG. 8, may include preventing, with a display of the electronic device 105, a view of the physical environment 600, and displaying the rendered virtual environment 800 with the display. Preventing the view of the physical environment with the display may include terminating display of some or all of a pass-through video feed from a camera of the electronic device or may include directing display light into an eye of a user with a transparent or translucent display of the electronic device that is disposed between the physical environment and the eye of the user.

Figure 9:
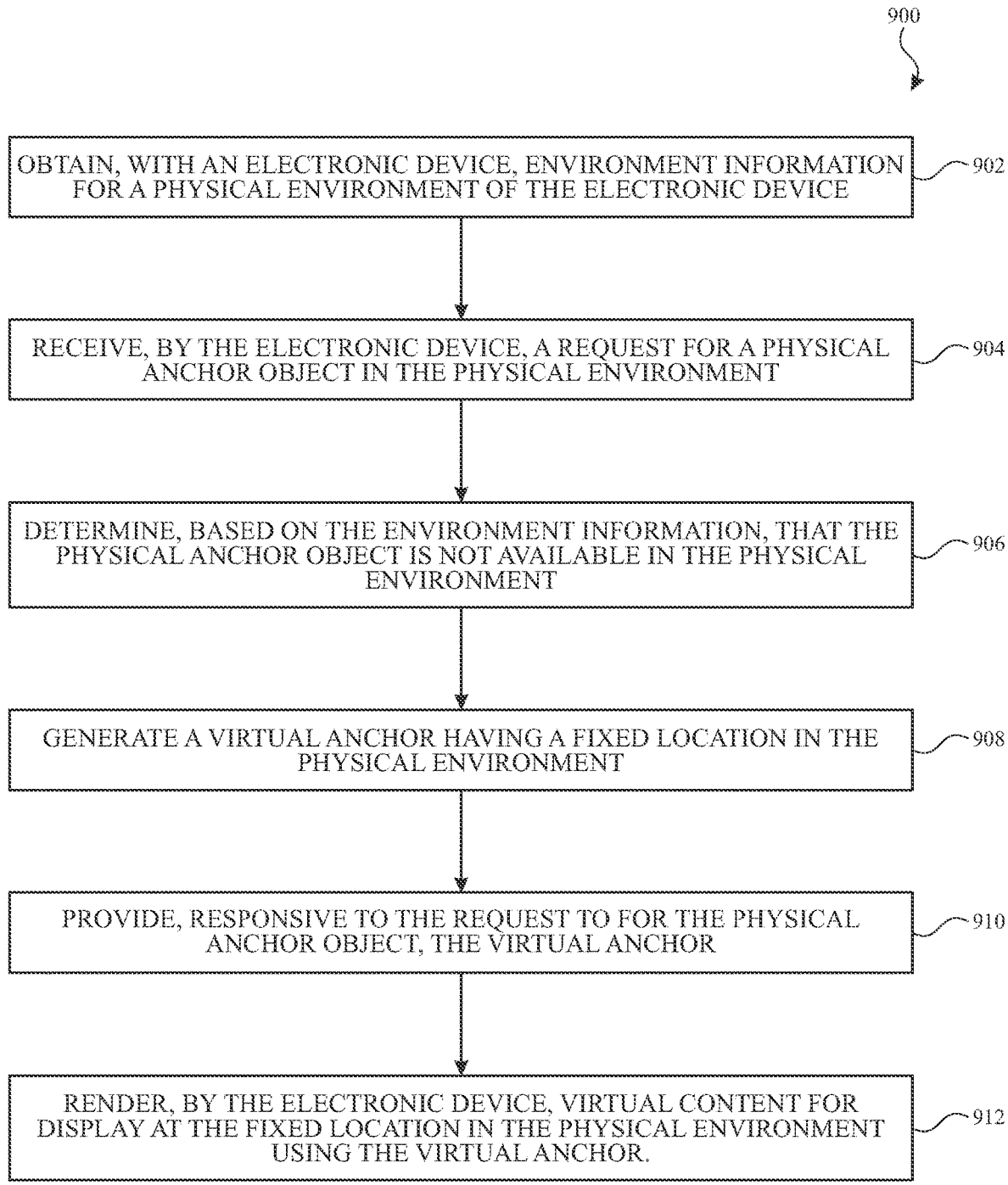
FIG. 9 illustrates a flow chart of example operations that may be performed for providing virtual anchors in accordance with implementations of the subject technology.

FIG. 9 illustrates a flow diagram of an example process 900 for providing virtual anchoring for an extended reality display device in accordance with implementations of the subject technology. For explanatory purposes, the process 900 is primarily described herein with reference to the electronic device 105 of FIGS. 1 and 2. However, the process 900 is not limited to the electronic device 105 of FIGS. 1 and 2, and one or more blocks (or operations) of the process 900 may be performed by one or more other components of other suitable devices, including the electronic device 110, the handheld electronic device 114, the electronic device 115, and/or the servers 120. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

As illustrated in FIG. 9, at block 902, an electronic device such as electronic device 105 obtains environment information for a physical environment of the electronic device. The environment information may include depth information, image information, object information, and/or other three-dimensional information about the physical environment (e.g., as determined using one or more depth sensors such as sensors 152 and/or one or more cameras such as camera(s) 150 of the electronic device).

At block 904, the electronic device receives (e.g., from an XR application such as XR application 202 at a mapping and object detection engine such as mapping and object detection engine 200 of FIG. 2) a request for a physical anchor object (e.g., physical table, a horizontal plane, a vertical plane, a physical wall, a physical floor, a couch, a chair, a television stand, a window, a tree, a flower, a cloud, etc.) in the physical environment.

At block 906, the electronic device determines, based on the environment information, that the physical anchor object is not available in the physical environment.

At block 908, the electronic device generates a virtual anchor having a fixed location in the physical environment. The fixed location may be defined relative to one or more objects or locations in the physical environment. The virtual anchor may be a point in space and/or may be associated with a virtual anchor object corresponding to the requested physical anchor object. For example, the electronic device may generate a virtual anchor object corresponding to the physical anchor object.

At block 910, the electronic device provides the virtual anchor (e.g., from a mapping and object detection engine such as mapping and object detection engine 200 to an XR application such as XR application 202), responsive to the request to for the physical anchor object.

At block 912, the electronic device renders, for display, virtual content for display at the fixed location in the physical environment using the virtual anchor. The electronic device may also render the virtual anchor object for display at the fixed location or at another fixed location defined relative to the fixed location in the physical environment. Rendering the virtual content for display at the fixed location in the physical environment using the virtual anchor may include positioning the rendered virtual content relative to the rendered virtual anchor object (e.g., by positioning virtual cup 320 on a virtual table 504 as in the example of FIG. 5 or FIG. 7, or positioning a virtual movie screen 802 on a virtual wall 804 as in the example of FIG. 8).

Figure 10:
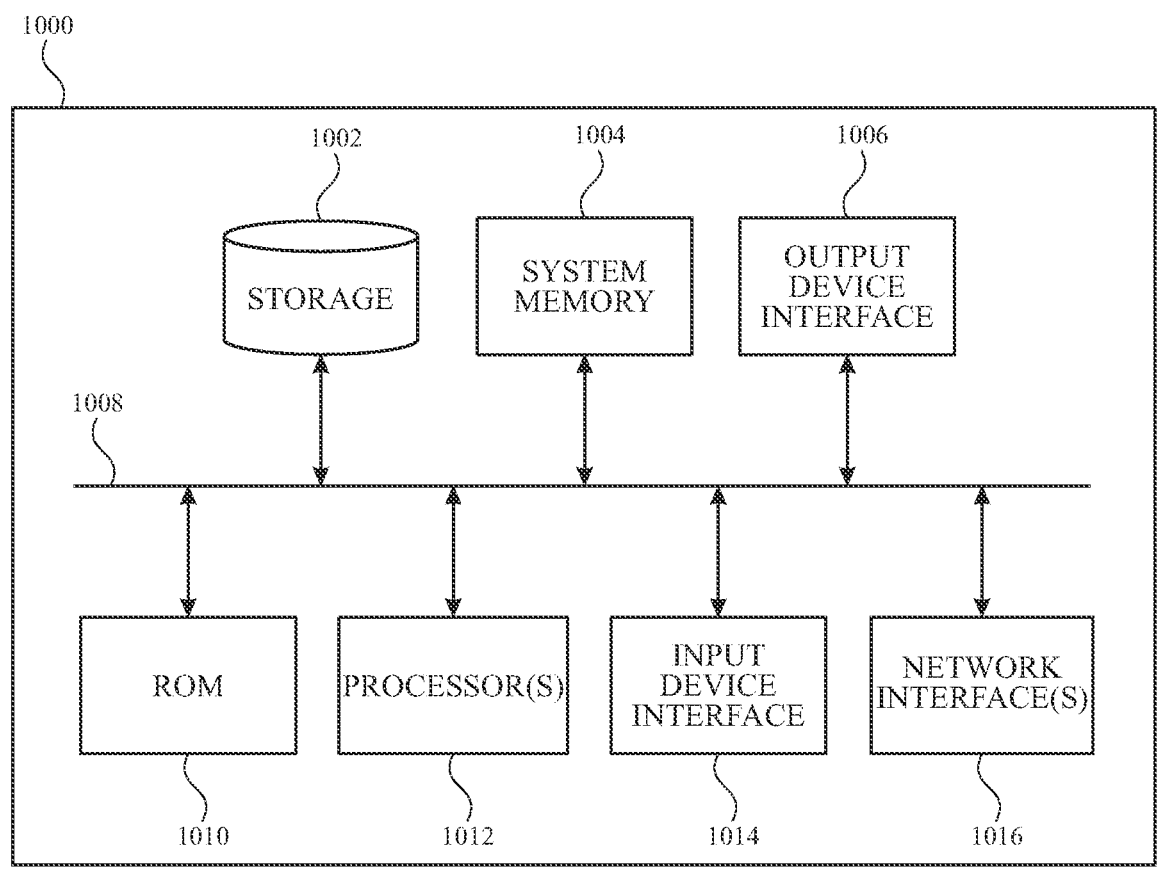
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 105, the handheld electronic device 104, the electronic device 110, the electronic device 115, and/or the server 120 as shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the subject disclosure, a method is provided that includes obtaining, with an electronic device, environment information for a physical environment of the electronic device; receiving, by the electronic device, a request for a physical anchor object in the physical environment; determining, based on the environment information, that the physical anchor object is not available in the physical environment; generating a virtual anchor having a fixed location in the physical environment; providing, responsive to the request to for the physical anchor object, the virtual anchor; and rendering, by the electronic device, virtual content for display at the fixed location in the physical environment using the virtual anchor.

In accordance with aspects of the subject disclosure, a system is provided that includes a processor and a memory device containing instructions, which when executed by the processor cause the processor to perform operations that include obtaining, with an electronic device, environment information for a physical environment of the electronic device; receiving, by the electronic device, a request for a physical anchor object in the physical environment; determining, based on the environment information, that the physical anchor object is not available in the physical environment; generating a virtual anchor having a fixed location in the physical environment; providing, responsive to the request to for the physical anchor object, the virtual anchor; and rendering, by the electronic device, virtual content for display at the fixed location in the physical environment using the virtual anchor.

In accordance with aspects of the subject disclosure, a non-transitory computer-readable medium is provided that includes instructions, which when executed by a computing device, cause the computing device to perform operations that include obtaining, with an electronic device, environment information for a physical environment of the electronic device; receiving, by the electronic device, a request for a physical anchor object in the physical environment; determining, based on the environment information, that the physical anchor object is not available in the physical environment; generating a virtual anchor having a fixed location in the physical environment; providing, responsive to the request to for the physical anchor object, the virtual anchor; and rendering, by the electronic device, virtual content for display at the fixed location in the physical environment using the virtual anchor.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method comprising:
    obtaining, with an electronic device, environment information for a physical environment of the electronic device;
    receiving, by the electronic device, a request for a physical anchor object in the physical environment;
    determining, based on the environment information, that the physical anchor object is not available in the physical environment;
    generating a virtual anchor having a fixed location in the physical environment, the fixed location of the virtual anchor being defined relative to one or more physical objects in the physical environment;
    providing, responsive to the request for the physical anchor object, the virtual anchor; and
    rendering, by the electronic device, virtual content for display at the fixed location in the physical environment using the virtual anchor.

2. The method of claim 1, further comprising:
    generating a virtual anchor object corresponding to the physical anchor object; and
    rendering the virtual anchor object for display at the fixed location in the physical environment, wherein rendering the virtual content for display at the fixed location in the physical environment using the virtual anchor comprises positioning the rendered virtual content relative to the rendered virtual anchor object.

3. The method of claim 2, further comprising, prior to generating the virtual anchor object, identifying an available space for the virtual anchor object based on the environment information.

4. The method of claim 3, further comprising determining a size for the virtual anchor object based on the identified available space for the virtual anchor object.

5. The method of claim 2, further comprising:
    prior to generating the virtual anchor object, determining, based on the environment information, that there is insufficient space in the physical environment for the virtual anchor object; and
    rendering a virtual portal for display over a portion of the physical environment, wherein rendering the virtual anchor object for display at the fixed location in the physical environment comprises rendering the virtual anchor object for display in the virtual portal.

6. The method of claim 5, further comprising:
    receiving, by the electronic device, user input corresponding to a request to resize the virtual portal; and
    rendering the virtual portal for display over an expanded portion of the physical environment.

7. The method of claim 2, further comprising:
    prior to generating the virtual anchor object, determining, based on the environment information, that there is insufficient space in the physical environment for the virtual anchor object; and
    rendering a virtual environment for display over the physical environment, wherein rendering the virtual anchor object for display at the fixed location in the physical environment comprises rendering the virtual anchor object for display at a fixed location in the virtual environment.

8. The method of claim 7, wherein the physical environment is a current physical environment of the electronic device, wherein the physical anchor object is a known physical anchor object in a known physical environment that is different from the current physical environment, and wherein the virtual environment is a virtual version of the known physical environment.

9. The method of claim 7, further comprising:
    preventing, with a display of the electronic device, a view of the physical environment; and
    displaying the rendered virtual environment with the display.

10. The method of claim 9, wherein preventing the view of the physical environment with the display comprises terminating display of a pass-through video feed from a camera of the electronic device.

11. The method of claim 9, wherein preventing the view of the physical environment with the display comprises directing display light into an eye of a user with a transparent or translucent display of the electronic device that is disposed between the physical environment and the eye of the user.

12. The method of claim 1, wherein the virtual anchor is a single point at the fixed location in the physical environment, and wherein rendering the virtual content using the virtual anchor comprises rendering the virtual content at the fixed location of the single point without rendering the single point for display.

13. The method of claim 1, wherein the fixed location of the virtual anchor is defined relative to a plurality of physical points in the physical environment.

14. The method of claim 1, wherein the receiving, by the electronic device, the request for the physical anchor object in the physical environment is based on a user interaction with the electronic device in the physical environment; and
    wherein the determining that the physical anchor object is not available in the physical environment is in response to the request for the physical anchor object based on the user interaction with the electronic device in the physical environment.

15. A system comprising:
    a processor;
    a memory device containing instructions, which when executed by the processor cause the processor to perform operations comprising:
        obtaining, with an electronic device, environment information for a physical environment of the electronic device;
        receiving, by the electronic device, a request for a physical anchor object in the physical environment;
        determining, based on the environment information, that the physical anchor object is not available in the physical environment;
        generating a virtual anchor having a fixed location in the physical environment, the fixed location of the virtual anchor being defined relative to one or more physical objects in the physical environment;

providing, responsive to the request for the physical anchor object, the virtual anchor; and rendering, by the electronic device, virtual content for display at the fixed location in the physical environment using the virtual anchor.

16. The system of claim 15, wherein the system comprises an extended reality display device configured to display content to a user.

17. The system of claim 16, wherein the extended reality display device comprises an opaque display and a camera configured to provide a pass-through video feed to the opaque display.

18. The system of claim 16, wherein the extended reality display device comprises transparent or translucent display.

19. The system of claim 16 wherein the extended reality display device comprises a camera and at least one depth sensor, and wherein the environment information is based on at least one image from the camera and depth information from the depth sensor.

20. The system of claim 15, wherein the operations further comprise:

generating a virtual anchor object corresponding to the physical anchor object; and rendering the virtual anchor object for display at the fixed location in the physical environment, wherein rendering the virtual content for display at the fixed location in the physical environment using the virtual anchor comprises positioning the rendered virtual content relative to the rendered virtual anchor object.

21. A non-transitory computer-readable medium comprising instructions, which when executed by a computing device, cause the computing device to perform operations comprising:

obtaining, with an electronic device, environment information for a physical environment of the electronic device;

receiving, by the electronic device, a request for a physical anchor object in the physical environment;

determining, based on the environment information, that the physical anchor object is not available in the physical environment;

generating a virtual anchor having a fixed location in the physical environment, the fixed location of the virtual anchor being defined relative to one or more physical objects in the physical environment;

providing, responsive to the request for the physical anchor object, the virtual anchor; and rendering, by the electronic device, virtual content for display at the fixed location in the physical environment using the virtual anchor.

22. The non-transitory computer-readable medium of claim 21, wherein the operations further comprise:

generating a virtual anchor object corresponding to the physical anchor object; and rendering the virtual anchor object for display at the fixed location in the physical environment, wherein rendering the virtual content for display at the fixed location in the physical environment using the virtual anchor comprises positioning the rendered virtual content relative to the rendered virtual anchor object.

* * * * *

UNITED STATES PATENT AND TRADEMARK OFFICE
CERTIFICATE OF CORRECTION

| | | |
|---|---|---|
| PATENT NO. | : 12,020,379 B2 | Page 1 of 1 |
| APPLICATION NO. | : 17/184588 | |
| DATED | : June 25, 2024 | |
| INVENTOR(S) | : Michael E. Buerli et al. | |

It is certified that error appears in the above-identified patent and that said Letters Patent is hereby corrected as shown below:

On the Title Page

Under (72) Inventors:
Column 1, Line 2: "Samuel L Iglesias" should read --Samuel L. Iglesias--;
Column 1, Line 4: "Mark A Ebbole" should read --Mark A. Ebbole--.

Under (56) References cited, U.S. PATENT DOCUMENTS:
Column 2, Line 2: "2/2016 Schmalsticg" should read --2/2016 Schmalstieg--.

Signed and Sealed this
First Day of October, 2024

Katherine Kelly Vidal
*Director of the United States Patent and Trademark Office*